United States Patent
Khojastepour et al.

(10) Patent No.: US 9,137,788 B2
(45) Date of Patent: Sep. 15, 2015

(54) MULTIPLE-INPUT MULTIPLE-OUTPUT WIRELESS COMMUNICATIONS WITH FULL DUPLEX RADIOS

(75) Inventors: Mohammad A. Khojastepour, Lawrenceville, NJ (US); Sanaz Barghi, Glendale, CA (US); Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 389 days.

(21) Appl. No.: 13/588,466

(22) Filed: Aug. 17, 2012

(65) Prior Publication Data
US 2013/0155912 A1 Jun. 20, 2013

Related U.S. Application Data

(60) Provisional application No. 61/531,057, filed on Sep. 5, 2011.

(51) Int. Cl.
| H04W 72/04 | (2009.01) |
| H04B 7/08 | (2006.01) |
| H04B 7/06 | (2006.01) |
| H04L 5/00 | (2006.01) |
| H04L 5/14 | (2006.01) |

(52) U.S. Cl.
CPC ........... *H04W 72/0413* (2013.01); *H04B 7/063* (2013.01); *H04B 7/0691* (2013.01); *H04B 7/0874* (2013.01); *H04L 5/0025* (2013.01); *H04L 5/0037* (2013.01); *H04L 5/0062* (2013.01); *H04L 5/14* (2013.01); *H04W 72/042* (2013.01); *H04B 7/0802* (2013.01)

(58) Field of Classification Search
CPC .... H04B 7/0413; H04B 7/063; H04B 7/0691; H04B 7/0874; H04B 7/0802; H04L 5/14
See application file for complete search history.

(56) References Cited

U.S. PATENT DOCUMENTS

| 6,912,195 | B2 * | 6/2005 | Vook et al. | 375/267 |
| 7,526,038 | B2 * | 4/2009 | McNamara | 375/267 |
| 7,564,910 | B2 * | 7/2009 | Kostic | 375/260 |
| 8,050,697 | B2 * | 11/2011 | Jia et al. | 375/299 |
| 8,094,743 | B2 * | 1/2012 | Ahn et al. | 375/267 |
| 8,111,709 | B2 * | 2/2012 | Hunukumbure et al. | 370/437 |
| 8,194,798 | B2 * | 6/2012 | Wang et al. | 375/341 |
| 8,204,504 | B2 * | 6/2012 | Naden et al. | 370/330 |

(Continued)

OTHER PUBLICATIONS

Choi, et al.; Achieving Single Channel, Full Duplex Wireless Communication}, Sep. 20-24, 2010; ACM; MobiCom '10, p. 1-12.*

M. Jain, J. Choi, T. Kim, D. Bharadia, S. Seth, K. Srinivasan, P. Levis, S. Katti, and P. Sinha, "Practical, real-time, full duplex wireless," 2011.

A. Sahai, G. Patel, and A. Sabharwal, "Pushing the limits of full-duplex: Design and real-time implementation," Arxiv preprint arXiv:1107.0607, 2011.

(Continued)

*Primary Examiner* — Marsha D Banks Harold
*Assistant Examiner* — William Johnson
(74) *Attorney, Agent, or Firm* — Joseph Kolodka; Akitaka Kimura

(57) ABSTRACT

An apparatus used in a full duplex multiple-input multiple-output (MIMO) wireless communications system is disclosed. In an aspect, the apparatus includes a plurality of antennas, each of which is connected to a combination of at least a TX (transmit) RF (radio frequency) chain and an RX (receive) RF chain. The plurality of antennas are split into one or more transmit antennas and one or more receive antennas, and the apparatus communicates with another apparatus. Other apparatuses and some methods for wireless communications also are disclosed.

7 Claims, 10 Drawing Sheets

(56) References Cited

U.S. PATENT DOCUMENTS

| | | | |
|---|---|---|---|
| 8,483,310 B2* | 7/2013 | Coldrey et al. | 375/259 |
| 8,515,435 B2* | 8/2013 | Krasny et al. | 375/267 |
| 8,724,743 B2* | 5/2014 | Dotzler et al. | 375/267 |
| 8,867,495 B2* | 10/2014 | Farajidana et al. | 370/252 |
| 8,942,082 B2* | 1/2015 | Shattil | 375/267 |
| 8,948,289 B2* | 2/2015 | Ko et al. | 375/267 |
| 2003/0003880 A1* | 1/2003 | Ling et al. | 455/92 |
| 2003/0031279 A1* | 2/2003 | Blount et al. | 375/346 |
| 2006/0209755 A1* | 9/2006 | Khan et al. | 370/329 |
| 2007/0242763 A1* | 10/2007 | Li et al. | 375/260 |
| 2008/0125154 A1* | 5/2008 | Zirwas et al. | 375/260 |
| 2008/0170523 A1* | 7/2008 | Han et al. | 370/310 |
| 2008/0260051 A1* | 10/2008 | Boccardi et al. | 375/259 |
| 2009/0016372 A1* | 1/2009 | Tao et al. | 370/437 |
| 2009/0316803 A1* | 12/2009 | Paker et al. | 375/260 |
| 2010/0130150 A1* | 5/2010 | D'Amico et al. | 455/226.1 |
| 2010/0272005 A1* | 10/2010 | Larsson et al. | 370/315 |
| 2010/0298016 A1* | 11/2010 | Madan et al. | 455/501 |
| 2011/0116393 A1* | 5/2011 | Hong et al. | 370/252 |
| 2011/0199913 A1* | 8/2011 | Sundaresan et al. | 370/243 |
| 2012/0058794 A1* | 3/2012 | Valentine | 455/513 |
| 2012/0257664 A1* | 10/2012 | Yue et al. | 375/227 |
| 2015/0016291 A1* | 1/2015 | Kim et al. | 370/252 |

OTHER PUBLICATIONS

B. Radunovic, D. Gunawardena, A. Proutiere, N. Singh, V. Balan, and P. Key, "Efficiency and fairness in distributed wireless networks through self-interference cancellation and scheduling," Tech. Rep. MSR-TR-2009-27, Microsoft Research, Mar. 2009, http://research.microsoft. com/apps/pubs/default. aspx, Tech. Rep.

S. Rangarajan, X. Zhang, S. Barghi, M. A. Khojastepour, and K. Sundaresan, "The case for antenna cancellation for scalable full-duplex wireless communications," Tech. Rep. 2011-TR074, NEC Laboratories America, Inc., Tech. Rep.

W. Pradeep Chathuranga, C. Marian, L. Matti, and E. Anthony, "On the effect of self-interference cancelation in multihop wireless networks," EURASIP Journal on Wireless Communications and Networking, vol. 2010, 2010.

H. Boche and M. Wiczanowski, "Optimization-theoretic analysis of stability-optimal transmission policy for multiple-antenna multiple-access channel," Signal Processing, IEEE Transactions on, vol. 55, No. 6, pp. 2688-2702, 2007.

S. Vishwanath, N. Jindal, and A. Goldsmith, "Duality, achievable rates, and sum-rate capacity of gaussian mimo broadcast channels," Information Theory, IEEE Transactions on, vol. 49, No. 10, pp. 2658-2668, 2003.

* cited by examiner

MULTIPLE-INPUT MULTIPLE-OUTPUT WIRELESS COMMUNICATIONS WITH FULL DUPLEX RADIOS

This application claims the benefit of U.S. Provisional Application No. 61/531,057, entitled, "Methods and apparatus for single cell and single link full duplex communications," filed Sep. 5, 2011, the contents of which are incorporated herein by reference.

BACKGROUND OF THE INVENTION

The present invention relates to multiple-input multiple-output (MIMO) wireless communications and more particularly to MIMO wireless communications with full duplex radios.

Realization of the full duplex communication systems requires overcoming multiple implementation challenges. In particular it is very important to realize a system that can use full duplex communication without sacrificing the benefits of multiple antenna technologies. A practical system may address (1) how many antennas should be assigned for reception and transmission, respectively, (2) in OFDM (Orthogonal Frequency Division Multiplexing) systems how the assignment of the uplink and downlink should be performed, (3) in a single cell MIMO systems how the base station should schedule the uplink and downlink users and what should be the power split, and (4) finally in asynchronous single cell systems how should the MAC layer be designed to exploit the full potential of the full duplex access point as well as the full duplex clients.

Some prior works have considered the design of full duplex communication systems:

[1] M. Jain, J. Choi, T. Kim, D. Bharadia, S. Seth, K. Srinivasan, P. Levis, S. Katti, and P. Sinha, "Practical, real-time, full duplex wireless," 2011.
[2] A. Sahai, G. Patel, and A. Sabharwal, "Pushing the limits of full-duplex: Design and real-time implementation," Arxiv preprint arXiv:1107.0607, 2011.
[3] B. Radunovic, D. Gunawardena, A. Proutiere, N. Singh, V. Balan, and P. Key, "Efficiency and fairness in distributed wireless networks through self-interference cancellation and scheduling," Tech. Rep. MSR-TR-2009-27, Microsoft Research, March 2009, http://research. microsoft. com/apps/pubs/default. aspx, Tech. Rep.
[4] S. Rangarajan, X. Zhang, S. Barghi, M. A. Khojastepour, and K. Sundaresan, "The case for antenna cancellation for scalable full-duplex wireless communications," Tech. Rep. 2011-TR074, NEC Laboratories America, Inc., Tech. Rep.
[5] W. Pradeep Chathuranga, C. Marian, L. Matti, and E. Anthony, "On the effect of self-interference cancelation in multihop wireless networks," EURASIP Journal on Wireless Communications and Networking, vol. 2010, 2010.

In [2] the authors estimate the channel and reconstruct the self-interference from digital samples. By using an extra transmit antennas the authors in [1] create a null at a single receive antenna. A digital noise cancellation algorithm known as active noise cancelation is used in [1]. The implementation of the active noise cancellation is performed through the use of QHx220 chip. In prior work [4], the authors have proposed the use of two copies of the self-interference signal in which case we need an extra Receive antenna for each original receive antennas.

In this specification, we address schemes and methods that address all the four problems described above. In particular, we provide guidelines on how to split the antennas between the transmit and receive RF (radio frequency) chains. We also provide method of allocating different tones in OFDM systems to uplink, downlink or full duplex (simultaneous uplink downlink) transmission. We also address the problem of user scheduling for full duplex communication in single cell. The full duplex scheduling is challenging due to the interferences that the uplink users will cause on the downlink users. The proposed scheduling algorithm depends on the number of transmit antennas and the number of active users and their channel gains. For a single cell systems when the scheduling is not possible and random access scheme is used, we also propose a method by which the base station or the access point can admit a new uplink communication while a downlink communication is in progress or it may initiate a new downlink transmission when an uplink transmission is already in session.

BRIEF SUMMARY OF THE INVENTION

An objective of the present invention is to simultaneously send in the uplink and downlink by enabling full duplex communication.

An aspect of the present invention includes an apparatus used in a full duplex MIMO wireless communications system. The apparatus includes a plurality of antennas, each of which is connected to a combination of at least a TX (transmit) RF (radio frequency) chain and an RX (receive) RF chain. The plurality of antennas are split into one or more transmit antennas and one or more receive antennas, and the apparatus communicates with another apparatus.

Another aspect of the present invention includes a method implemented in a base station used in a full duplex MIMO wireless communications system. The method includes dividing a set of OFDM tones into a first group for uplink and a second group for downlink, scheduling a first user equipment in a first group and a second user equipment in the second group, receiving, from the second user equipment, information about interference on an OFDM tones in the first group, and scheduling one or more downlink users in the first group according to the information.

Still another aspect of the present invention includes a method implemented in a base station used in a full duplex MIMO wireless communications system. The method includes dividing a set of OFDM tones into a first group for uplink and a second group for downlink, scheduling a first user equipment in a first group and a second user equipment in the second group, measuring downlink enhancement, and allocating one or more OFDM tones in the second group to uplink according to the downlink enhancement.

Still another aspect of the present invention includes a method implemented in a base station used in a full duplex MIMO wireless communications system. The method includes scheduling one or more user equipment in an OFDM tone used for full duplex communications, according to a prior schedule and an achieved rate.

DETAILED DESCRIPTION

Figure 1:
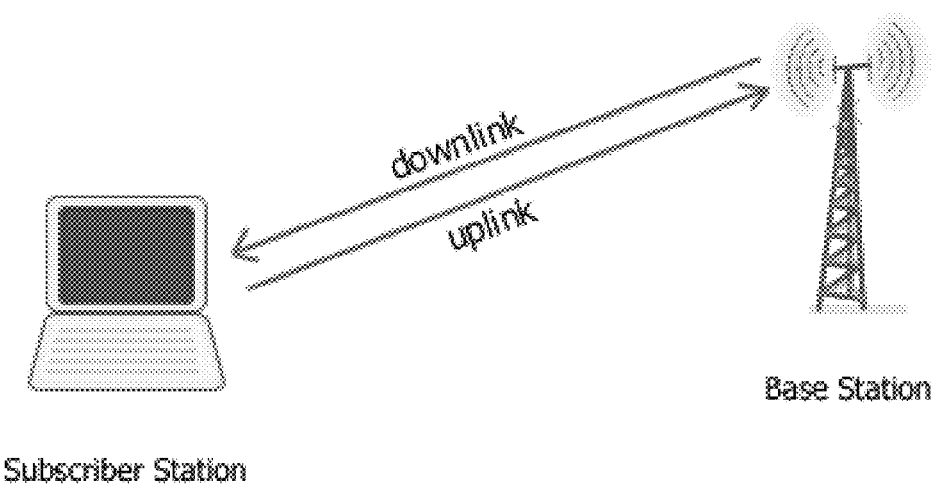
FIG. 1 depicts full duplex communications.

By enabling full duplex communication we can simultaneously send in the uplink and downlink and it could mean doubling the use of spectrum (FIG. 1). In half-duplex systems we either receive or transmit in time TDD (time-division duplex) or in frequency FDD (frequency-division duplex), so it may be thought that we waste half of the resources.

Figure 2:
FIG. 2 depicts strong self interference signals in comparison to weak received signals from an intended transmitter.

The main challenge of the full duplex communication is to cancel the self interference that is orders of magnitude stronger than the received signal from the intended transmitters. This interference is partly known due to the fact that the transmitter exactly knows its own transmitted signal, though the exact channel between the transmit and receive antennas at the base station is not known. It would be even worse if this channel is time varying or fading because we then need to estimate this channel more frequently. FIG. 2 shows the strong self interference in comparison to the weak received signal from a mobile station or user.

Figure 3:
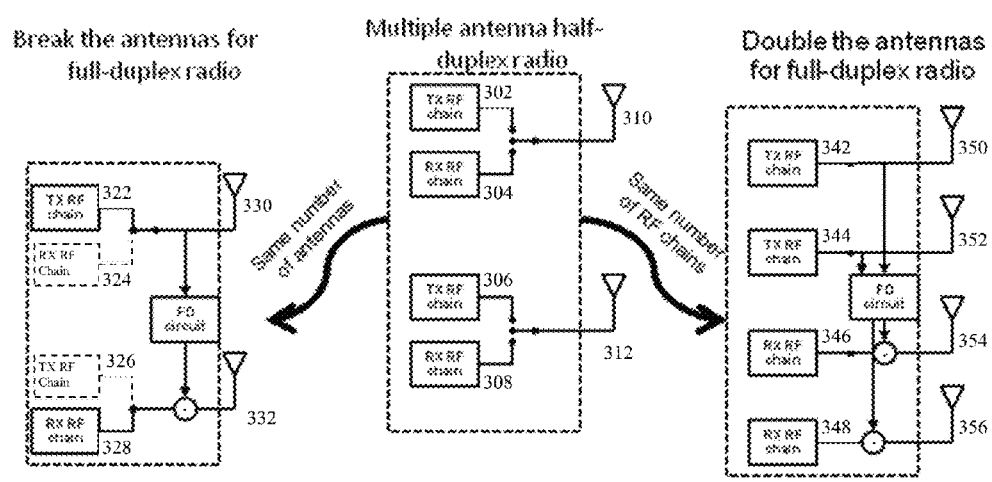
FIG. 3 depicts antenna deployment scenarios with the same number of antennas and with the same number of transmit and receive RF chains.

There are two possible deployment of the full duplex communication with respect to a fixed number of transmit and receive RF chains 302, 304, 306, and 308. In practice the main complexity involved with the use of multiple antennas 310 and 312 is associated with the number of RF chain due to the fact that channel estimation, precoding, beamforming, multiple stream transmission, and demodulation all depends on the number of receive RF chains or transmit RF chains. Depending on if we use one antenna 330 for each pair of transmit RF chain 322 and receive RF chain 324 or if we use two antennas 350 and 354, which means one 354 for receive RF chain 346 and the other 350 for transmit RF chain 342, we can have one of the two possible deployment scenarios. See FIG. 3.

Both systems may have marginal pros or cons in half duplex systems. We may use one antenna per RF chain for full duplex communication because it does not change the system complexity. However, the cost associated with using more physical antennas well worth the possible gain that can be achieved by this deployment scenario. In the sequel, we address how to allocate the antennas for either transmit or receive if this deployment scenario is used.

1) In single link system, if both links have one transmit antenna per RF chain there is no need for antenna splitting and the average gain of FD with respect to HD (half-duplex) transmission would be 2. However, for particular realization of the channel this gain could be different. If one antenna is used for a pair of TX (transmit) and RX (receive) RF chain, antennas can be split into one or more transmit antennas and one or more receive antennas. The antenna splitting between the transmit and receive antennas is very critical. The antenna splitting may be based on the channel condition. The system may perform the antenna splitting so that capacity gain is increased. If the system cannot dynamically change the antenna selection for full duplex communication very fast, then we may set the antenna splitting that will work in average. We show that the average capacity gain of full duplex with respect to half duplex is given by the following formula:

$$\varepsilon\{G_{FD}\} \approx \begin{cases} \frac{(M-M_1)+(N-N_1)}{0.5(M+N)} = 2 - 2\frac{N_1+M_1}{N+M} & \rho \ll 1 \\ \frac{\min(N_1, M-M_1) + \min(N-N_1, M_1)}{\min(N, M)} & \rho \gg 1 \end{cases}$$

where $G_{FD}$ is the capacity gain, $\varepsilon\{\ \}$ is the expectation operator or statistical average, $\rho$ represents the average SNR (signal to noise ratio), M and N are the numbers of antennas at node 1 and 2, respectively, and $M_1$ and $N_1$ are the numbers of transmit antennas at node 1 and node 2, respectively.

From the above formula, it can be the best to set $N_1$ and $M_1$ to one regardless of the number of antennas N and M. This means that each node selects only one antenna for transmission and uses all the other antennas for reception. At high SNR, the split can be almost equal between the number of transmit and receive antennas at each node. In particular, if N=M, then $M_1=N_1=M/2$ maximizes the gain. If N<M then the solution is to set $N_1=N/2$. However, $M_1$ can take different values as long as $M>M_1+N_1>N$. M/2 and N/2 can be M/2±½ and N/2±½ when M and N are odd, respectively.

2) When OFDM system is used, one problem is how to find the splits between the OFDM tones into three groups where either one of uplink, downlink or simultaneous FD transmission is used. One strategy is to dynamically let the system finds the splits between these three groups. Since initiation of a full duplex communication in a single tone requires the knowledge of the interference in that tone on the downlink users, it is critical to have this information before scheduling any user in the downlink in that particular tone. In time varying environment it is important to periodically have this information before the scheduling. Therefore, the system begins the operation by dividing the set of OFDM tones into two groups: one for the uplink and the other one for the downlink. We assume that within a group of frames, e.g. a super frame, the channel does not change. While the system is in operation, the users in the downlink measure the interference on one or multiple OFDM tones that are in the uplink group. The downlink user then report a free channel signal in case that this interference is below a certain threshold. This threshold may be fixed or set periodically by BS (base station) or MS (mobile station). The initiation of the feedback of this information could be by the base station or by the MS. There may also be a fixed schedule when a downlink user may feedback this information.

Based on this information, the BS then may select one or more downlink users to be scheduled in the same set of tones as some uplink users. This procedure allows for allocating some of the uplink tones to full duplex operation. This operation can only boost the downlink throughput. In order to allow for enhancement in the uplink, we can also have a secondary method in place. Over multiple super frames we measure the downlink enhancement and then we allocate some of the downlink tones to uplink. The enhancement may be measured in terms of the throughput, other quality of service or system utility measures. This reassignment of downlink tones to uplink would be dependent on the enhancement that we have received over a group of past superframes. By having both methods in place, it is then possible to exchange some of the enhancement received in the downlink for enhancement in the system utility for the uplink.

3) The scheduling of the users for the simultaneous uplink and downlink is based on an optimization of a system utility such as weighted sum rate where the weight itself changes in time based on the past operation of the systems and channel condition. The entire operation is discussed in the further system details.

4) Simultaneous uplink and downlink operation in the CSMA (carrier sense multiple access) single cell network also requires a modified MAC (media access control) layer.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Further System Details

1 Introduction

Recently there has been a huge interest in designing the full-duplex radios [1–4]. Unlike half-duplex radios that need to separate their receptions and transmissions on different frequency bands (FDD) or different time slots (TDD), full-duplex radios are capable of receiving and transmitting simultaneously in the same frequency band. Hence, an ideal full-duplex radio can double the spectral efficiency compared to a half-duplex radio and increase the overall throughput of the wireless networks.

Besides increasing the spectral efficiency, full-duplex radios are shown to improve the fairness in CSMA/CA networks, e.g. IEEE 802.11, [1,3], and solve the hidden terminal problem associated with such networks [1,3]. The higher layer benefits provided by full-duplex radios can further boost the throughput of these networks.

In order to put full-duplex (FD) radios into reality, the radio receives and transmits over different antennas. Having new antennas on the radio for the FD is not equivalent to having a new antenna for MIMO connections [4] in terms of additional hardware requirements. For a MIMO transceiver each antenna is connected to two RF chains, one transmission chain and one reception chain. While for FD antennas, each antenna is used either for transmission or reception, therefore, only one RF chain is attached to each antenna. However, FD does not come for free and requires adding some RF elements to the radio [1,2,4]. We will show through extensive simulation and analysis that FD is inferior to MIMO in most scenarios or provide low gains if the same number of antennas for the two systems are considered, while separating transmit and receive antennas can be beneficial.

[5] investigates the effects of self-interference in multi-hop wireless networks by designing a scheduling algorithm which takes into account the FD capability of the radios. In their study, different levels of self-interference are considered and it is shown that having a certain level of interference cancellation provides almost the same gain as a perfect FD, therefore, we assume that the FD radio is good enough to rpoduce enough isolation between its transmit and receive antennas.

In this description, we study the gain achievable in the physical layer, i.e. the capacity improvement, when additional antennas are employed to form FD radios instead on MIMO links. We consider two different scenarios, in the antenna break scenario we let the MIMO and FD radios have the same number of antennas and for FD a fraction of the available antennas are used as transmit antennas and the remaining antennas are receive antennas. In the double scenario, number of receive and transmit antennas of FD radio are the same as that of the MIMO radio, which means to compare a 2 × 2 MIMO system with a double FD, the FD node will have two transmit and two receive antennas on each node. Going into details of the implementing such systems is out of the scope of this description, and what we are looking into is the potential theoretical gains achievable from using FD radios.

This description is organized as follows: Section 2 includes the definitions of channel capacity. In Section 3, we look at the FD gain in point-to-point scenario and introduce the scheduling algorithm for a full-duplex cellular network. Section 4 presents the numerical results and discussions.

2 System Model

In the first step, self-interference cancellation is assumed to be ideal, which means transmission by a node will not cause interference on the reception of the signal by the same node. This may be an optimistic assumption, and will provide upper bounds for the performance of the system.

For a MIMO point-to-point link with $N$ transmit antennas and $M$ receive antennas, the received signal has the following format:

$$\mathbf{y} = \mathbf{H}\mathbf{x} + \mathbf{z} \qquad (1)$$

where $\mathbf{x}$ is the transmitted signal, $\mathbf{y}$ is the received signal, $\mathbf{z}$ is the additive Gaussian noise, and $\mathbf{H}$ is the $M \times N$ channel matrix with i.i.d. Gaussian distributed elements. There are different definitions of capacity for fading channels and we present relevant definitions here:

1. Outage capacity for the outage probability of $P_{out}$:

$$C_{outage} = \{R : Pr(C_{CSIR} < R) = P_{out})\} \qquad (2)$$

Outage capacity is meaningful for systems that only have a direct or indirect feedback of the average SNR/drop-rate of the system. For example, in IEEE 802.11a,b,g the adaptive modulation is being used without any explicit feedback from the clients, and usually the system adapts itself based on the average packet drop rates. In these scenarios, outage capacity is a good measure of the performance.

2. Capacity with channel state information at the receiver (CSIR) and rate feedback:

$$C_{CSIR} = \log\left(det\left(I_{M \times M} + \frac{\rho}{N}HH^*\right)\right) \quad (3)$$

Where $\rho$ is the received SNR per antenna of the receiver, $\rho = \frac{P}{N_0}$, and $(.)^*$ represents hermitian transpose. This is the capacity achievable in open-loop systems where the channel variations are slow enough that the receiver can obtain the channel information and feed back the value of the above capacity to the transmitter, in-time. Transmitter distributes its power equally over its antennas and transmits with the rate of $C_{CSIR}$.

3. Capacity with channel state information at the transmitter (CSIT) and receiver:

$$C_{CSIT} = \sum_{i=1}^{min(M,N)} \log(1 + \frac{p_i}{N_0}\lambda_i) \quad (4)$$

where, $\lambda_i$ is the $i$th eigenvalue of the matrix $HH^*$ and $p_i = \left(\mu - \frac{1}{\lambda_i}\right)^+$, and $\mu$ is chosen such that $\sum p_i = P$.

For a cellular setting, with $n$ $M$-antenna clients and one $N$-antenna access point, the uplink received signal is given by:

$$y = \sum_{i=1}^{n} H_i x_i + z \quad (5)$$

The capacity achieving decoding strategy for MAC channel is successive interference cancellation (SIC). Given the decoding order $\pi_1, \pi_2, ..., \pi_n$ where user $\pi_n$ is decoded first by considering other users' signal as noise, and user $\pi_1$ will be decoded last when all the interference from other users is canceled. The capacity of user $\pi_i$ is given by:

$$C_{MAC} = \log \frac{det\left(IN_0 + \sum_{j=1}^{i} H_{\pi_j} P_{\pi_j} H_{\pi_j}^*\right)}{det\left(IN_0 + \sum_{j=1}^{i-1} H_{\pi_j} P_{\pi_j} H_{\pi_j}^*\right)} \quad (6)$$

For downlink, there is a single transmitter and multiple receivers. The received signal by user $i$ on downlink is:

$$y_i = H_i \sum_{j=1}^{n} x_j + z_i \quad (7)$$

Capacity achieving scheme for a broadcast (BC) channel is dirty paper coding (DPC), which needs a coding order. Given the order $\mu_1, \mu_2, ..., \mu_n$, where the user $\mu_n$ is coded last, and user $\mu_1$ is coded first, the capacity of user $\mu_i$ is given by:

$$C_{BC} = \log \frac{det\left(IN_0 + \mathbf{H}_{\mu_i} \sum_{j=i}^{n} \mathbf{Q}_{\mu_j} \mathbf{H}_{\mu_i}^*\right)}{det\left(\mathbf{IN_0} + \mathbf{H}_{\mu_i} \sum_{j=i+1}^{n} \mathbf{Q}_{\mu_j} \mathbf{H}_{\mu_i}^*\right)} \tag{8}$$

Where $\mathbf{Q_i}$ is the covariance matrix of the transmitted signal from user $i$. Please note that if different users are experiencing different channel noises, by normalizing the channel matrices to the noise variance one gets BC with unit noise variance for all users.

3 Performance Evaluation

3.1 Point-to-point

Separating the antennas as receive and transmit antennas, i.e. double scenario, will trivially double the capacity of the point-to-point links for perfect FD. Results in [3], show that even with imperfect self-interference cancellation in one antenna per direction case, imperfect FD shows considerable gain compared to half-duplex (HD).

The interesting scenario is then the breaking scenario. Suppose that we have two nodes, node $A$ with $N$ antennas and node $B$ with $M$ antennas. To activate a FD connection, nose $A$ and $B$ choose $N_1$ and $M_1$ antennas for transmission, respectively, and the rest of their antennas for reception.

Since the capacity of the HD links can be different from node $A$ to node $B$ and in the reverse direction, we assume a time sharing between the two links and the average of the two capacities is considered as the capacity of the MIMO HD link, while we let the FD transmissions take place over one time slot. Therefore, the capacity gain of point-to-point FD with respect to point-to-point HD is defined as, $G = \frac{C_{A \to B}^{FD} + C_{B \to A}^{FD}}{0.5\left(C_{A \to B}^{HD} + C_{B \to A}^{HD}\right)}$

3.1.1 Outage Capacity

For $N = 2$, $M = 2$ the outage probability of rate $R$ for a Rayleigh fading channel has the following form:

$$P_{out}(R) = \int_0^\infty F_{\lambda_1}(\frac{2^R}{\lambda\gamma/2 + 1} - 1 | \lambda_2 = \lambda) f_\lambda(\lambda) d\lambda \tag{9}$$

where, $F_{\lambda_1}(\lambda|\lambda_2) = e^{-\lambda \frac{1+(\lambda-\lambda_2+1)^2}{1+(1-\lambda_2)^2}}$ and $f_\lambda(\lambda) = \frac{1}{2}e^{-\lambda}(1 + (1+\lambda)^2)$ are the conditional CDF and unconditional PDF of the eigenvalues of the Wishart matrix $HH^*$. Breaking the antennas to one transmit and one receive antenna on each node will result in the following outage probability for the FD connection:

$$P_{out}(R) = 1 - e^{-\frac{2^{R/2}-1}{2}} \tag{10}$$

3.1.2 Capacity with CSIR

Given some feedback in the system, the transmission does not need to accept errors as in outage capacity case, and transmissions can be performed error free at the instantaneous capacity of the channel. In most open-loop wireless systems, the receiver sends a feedback to let the transmitter know which rate to use for transmission. Capacity expression in Eq. (3) can be approximated for very high, and very low SNR as follows:

$$C_{CSIR} \approx \begin{cases} \log_2 e \frac{\rho}{N} \sum_{i=1}^{N} \sum_{j=1}^{M} |h_{ij}|^2 & \rho \ll 1 \\ \min(N,M) \log_2 \left(\frac{\rho}{M}\right) + \sum_{i=1}^{\min(N,M)} \log_2 \lambda_i \approx \min(N,M) \log_2(\rho) & \rho \gg 1 \end{cases} \quad (11)$$

Therefore, the average of the capacity in low and high SNR conditions is given by:

$$\mathcal{E}\{C_{CSIR}\} \approx \begin{cases} M\rho \log_2 e & \rho \ll 1 \\ \min(N,M) \log_2(\rho) & \rho \gg 1 \end{cases} \quad (12)$$

Given the above approximations, the gain of FD over HD for low and high SNRs is:

$$\mathcal{E}\{G_{FD}\} \approx \begin{cases} \frac{(M-M_1)+(N-N_1)}{0.5(M+N)} = 2 - 2\frac{N_1+M_1}{N+M} & \rho \ll 1 \\ \frac{\min(N_1, M-M_1) + \min(N-N_1, M_1)}{\min(N,M)} & \rho \gg 1 \end{cases} \quad (13)$$

From Eq. (13), we can conclude that breaking the antennas for FD transmission at very low SNRs can provide gains of more than 1 over MIMO-HD link by appropriately breaking the antennas, while at high SNRs the gain of using FD is always less than 1 independent of the way we break the antennas.

3.1.3 Waterfilling

At high SNRs, the optimum waterfilling policy is equal power over all antennas, and at low SNR the best policy will be transmitting with full power over the direction of the eigenvector with largest eigenvalue. Therefore, the following expressions represent the FD gain in the two extreme cases:

$$G_{FD} \approx \begin{cases} \frac{\lambda_{max}(\mathbf{H}_2^T \mathbf{H}_2^*) + \lambda_{max}(\mathbf{H}_3^* \mathbf{H}_3)}{\lambda_{max}(\mathbf{H}\mathbf{H}^*)} & \rho \ll 1 \\ \frac{\min(N_1, M-M_1) + \min(N-N_1, M_1)}{\min(N,M)} & \rho \to \infty \end{cases} \quad (14)$$

Where $\mathbf{H} = \begin{pmatrix} \mathbf{H}_1 & \mathbf{H}_2 \\ \mathbf{H}_3 & \mathbf{H}_4 \end{pmatrix}$. Note that, FD gain approaches one for its maximum over different antenna breakages at high SNRs.

3.2 Cellular

In this section we are considering scheduled transmission in a WLAN setting, where the access point has all required channel state informations and weights associated with each link. Based on this information, access point makes the decision about which nodes will transmit/receive in the next time slot and what is the transmission power associated with active links. Power constraint on uplink transmissions is per link power constraint, where each node can use the power $P_u$ when it is active, $Tr(P_i) \leq P_u$. For downlink transmissions, the access point has a constraint on the total power it can consume while making the transmission to different users, $Tr(\mathbf{Q_1 + Q_2 + ... + Q_n}) \leq \mathbf{P_d}$.

A scheduling center makes its decisions based on the weights associated with each link in the network. The weight can be representative of the links priority, queue length, average service rate, delay of the packet in the head of the line, etc. In this work we use the inverse of the average service rate of each link as the weight of the link. The average rate for link $i$, $Ra_i$ evolves as follows:

$$Ra_i(t+1) = (1 - \frac{1}{T_c})Ra_i(t) + \frac{1}{T_c}R_i(t) \qquad (15)$$

where $T_c$ is the averaging window size and $R_i(t)$ is the rate associated with link $i$ in time-slot $t$. Therefore, the objective of the scheduler will be maximizing the following weighted sum rate at each time slot, subject to the corresponding power constraints:

$$\max \sum_{i=1}^{n} \frac{1}{Ra_i(t)} R_i(t) \qquad (16)$$

To study the theoretical limits of the gains achievable with FD radios, we consider single antenna clients and an access point with $N$ antennas. Access point will perform SIC to decode multi-user uplink transmissions and DPC to encode data for downlink transmissions. First we look at the half-duplex scheduling problem. Let's assume that downlink and uplink transmissions are separated in time, such that each time slot is divided into two mini time-slots, each for one direction of the transmission. In this setting, problems of scheduling downlink and uplink transmissions become decoupled as follows:

Uplink:

$$\max_{p_i, \pi_i \ i=1,2,...,n} \sum_{i=1}^{n} w_{u,\pi_i} \log \frac{det\left(\mathbf{IN_0} + \sum_{j=1}^{i} \mathbf{H}_{\pi_j} \mathbf{p}_{\pi_j} \mathbf{H}^*_{\pi_j}\right)}{det\left(\mathbf{IN_0} + \sum_{j=1}^{i-1} \mathbf{H}_{\pi_j} \mathbf{p}_{\pi_j} \mathbf{H}^*_{\pi_j}\right)}$$

$$s.t. \quad p_i \leq P_u$$

Downlink:

$$\max_{\mathbf{Q_i}, \mu_i \ i=1,2,...,n} \sum_{i=1}^{n} w_{d,\mu_i} \log \frac{\left(N_0 + \mathbf{G}_{\mu_i} \sum_{j=i}^{n} \mathbf{Q}_{\mu_j} \mathbf{G}^*_{\mu_i}\right)}{\left(N_0 + \mathbf{G}_{\mu_i} \sum_{j=i+1}^{n} \mathbf{Q}_{\mu_j} \mathbf{G}^*_{\mu_i}\right)}$$

$$s.t. \quad Tr(\mathbf{Q_1 + Q_2 + ... + Q_n}) \leq \mathbf{P_d} \qquad (17)$$

where $W_{u,i} = \frac{1}{Ra_i^u(t)}$ for uplinks and $w_{d,i} = \frac{1}{Ra_i^d(t)}$ for each downlink. The optimization problems in Eq. (17) are in general non-convex problems. The good news is that both problems can be converted to convex problems, simply by noting that the optimal decoding order for the MAC channel is given by $\pi_1, \pi_2, ..., \pi_n$ such that $w_{u,\pi_n} \leq w_{u,\pi_{n-1}} \leq ... \leq w_{u,\pi_1}$ [6]. With this ordering, links with higher weights, face less interference and will be provided with higher rates. Furthermore, capacity region of each BC channel is the same as the capacity region of its dual MAC channel with the same power constraint [7]. The new optimization problems are:

Uplink:

$$\max_{p_i \; i=1,2,\ldots,n} \sum_{i=1}^{n}(w_{u,\pi_i} - w_{u,\pi_{i+1}}) \log det \left( \mathbf{IN_0} + \sum_{j=1}^{i} \mathbf{H}_{\pi_j} \mathbf{p}_{\pi_j} \mathbf{H}^*_{\pi_j} \right)$$

$$s.t. \quad p_i \leq P_u \; \forall i \leq n$$

Downlink:

$$\max_{q_i \; i=1,2,\ldots,n} \sum_{i=1}^{n}(w_{d,\mu_i} - w_{d,\mu_{i+1}}) \log det \left( \mathbf{IN_0} + \sum_{j=1}^{i} \mathbf{G}^*_{\mu_j} \mathbf{q}_{\mu_j} \mathbf{G}_{\mu_j} \right)$$

$$s.t. \quad \sum_{i=1}^{n} q_i \leq P_d \tag{18}$$

$Q_i$'s are functions of $q_i$'s and the relation between them can be found in [7].

For FD scheduling, uplink and downlink scheduling is entangled together because of the mutual interference between uplink transmissions and downlink receptions. Please note that for scheduling the FD transmissions, access point needs the information about the channel between all pairs of users to be able to predict the level of interference that active uplink transmissions will cause on active downlink receptions. Given all channel coefficients and link weights, the scheduler optimizes the following objective function:

$$\max_{p_i,q_i,\pi_i,\mu_i \; i=1,2,\ldots,n} \sum_{i=1}^{n} w_{u,\pi_i} \log \frac{det \left( \mathbf{I}(\mathbf{N_0} + g\mathbf{q}_{\pi_i}) + \sum_{j=1}^{i} \mathbf{H}_{\pi_j} \mathbf{p}_{\pi_j} \mathbf{H}^*_{\pi_j} \right)}{det \left( \mathbf{I}(\mathbf{N_0} + g\mathbf{q}_{\pi_i}) + \sum_{j=1}^{i-1} \mathbf{H}_{\pi_j} \mathbf{p}_{\pi_j} \mathbf{H}^*_{\pi_j} \right)}$$

$$+ \sum_{i=1}^{n} w_{d,\mu_i} \log \frac{det \left( \mathbf{I} + \sum_{j=1}^{i} \tilde{\mathbf{G}}^*_{\mu_j} \mathbf{q}_{\mu_j} \tilde{\mathbf{G}}_{\mu_j} \right)}{det \left( \mathbf{I} + \sum_{j=1}^{i-1} \tilde{\mathbf{G}}^*_{\mu_j} \mathbf{q}_{\mu_j} \tilde{\mathbf{G}}_{\mu_j} \right)}$$

$$s.t. \quad p_i \leq P_u \; \forall i \leq n$$

$$\sum_{i=1}^{n} q_i \leq P_d \tag{19}$$

where $g = 0$ if the clients are also FD capable and $g = 1$ if clients are simple nodes with only HD capability. Adding the term $gq_{\pi_i}$ when $g = 1$ leaves out the scheduls that contain simultaneous uplink and downlink transmissions to a single client. Furthermore, the modified channel matrices from the access point to clients are given by:

$$\tilde{\mathbf{G}}_i = \frac{1}{\sqrt{N_0 + \sum_{j=1}^{n} |h_{ji}|^2 p_j + gp_j}} \mathbf{G} \tag{20}$$

Where the term $gP_i$ is placed to differentiate the two types of clients, and $h_{ji}$ is the channel coefficient from client $j$ to client $i$.

Eq. (19) is not a convex problem, and the optimal order of coding/decoding for MAC/BC is unknown. One suboptimal solution is to use MAC and BC optimal orderings which depends only on the weights of the links. This coding/decoding order simplifies Eq. (19) to:

$$\max_{p_i, q_i} \sum_{i=1}^{n}(w_{u,\pi_i} - w_{u,\pi_{i+1}}) \log \det \left( I N_0 + \sum_{j=1}^{i} H_{\pi_j} p_{\pi_j} H_{\pi_j}^* \right)$$

$$+ \sum_{i=1}^{n}(w_{d,\mu_i} - w_{d,\mu_{i+1}}) \log \det \left( I + \sum_{j=1}^{i} \tilde{G}_{\mu_j}^* q_{\mu_j} \tilde{G}_{\mu_j} \right)$$

$$s.t. \quad p_i \leq P_u \; \forall i \leq n$$

$$\sum_{i=1}^{n} q_i \leq P_d \qquad (21)$$

Interdependence of $\tilde{G}$ with $p_i$'s makes this problem non-convex, therefore, answers found for this problem through numerical search are local, and generally sub-optimal. Although suboptimal, we will show improvements in the throughput of the network using FD.

4 Numerical Results

In this section, we compare the performance of the HD and FD systems, using the formulations in Section 3.

4.1 Outage capacity

Figure 4A:
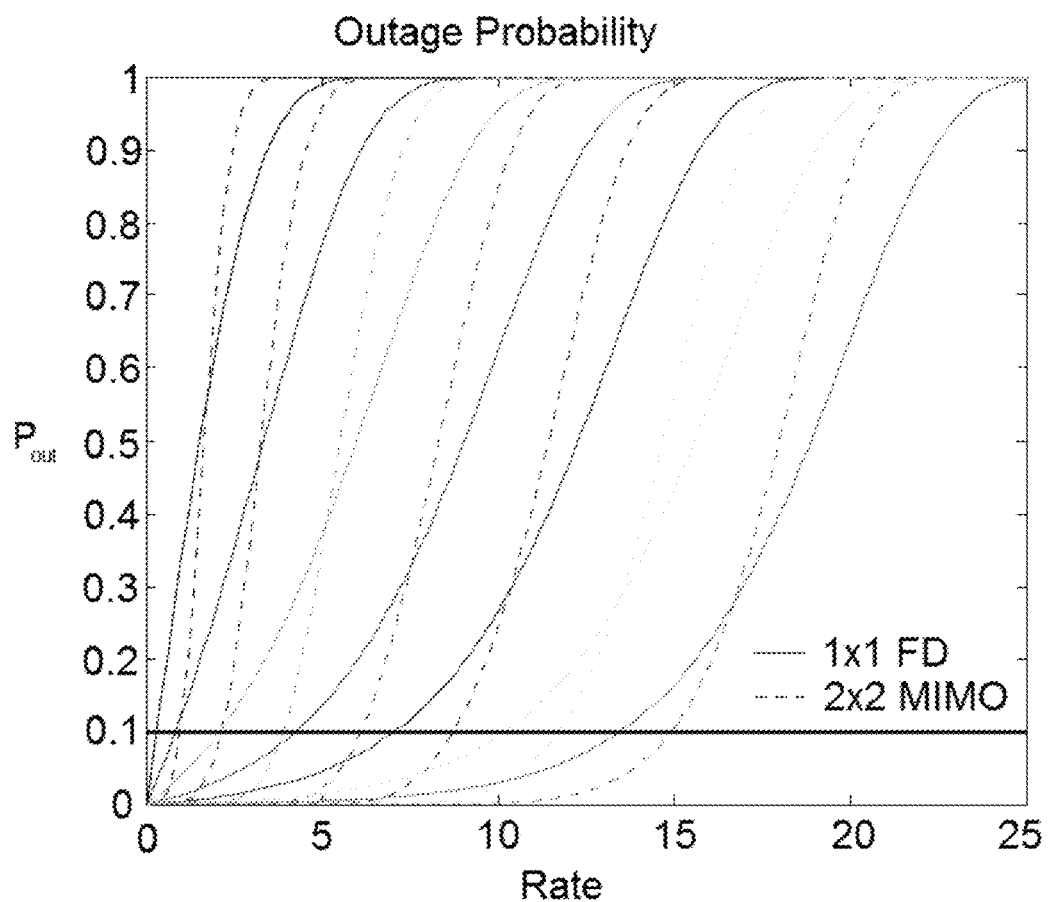
FIG. 4 depicts FD (full-duplex) gain with outage capacity as a measure.
Figure 4B:
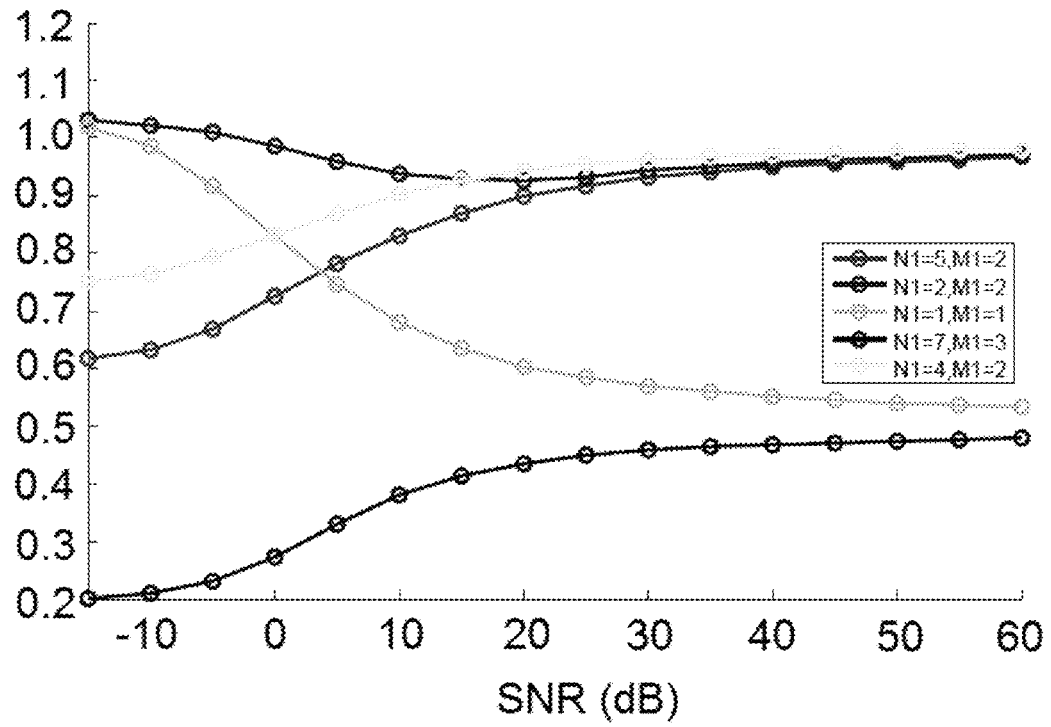

The outage probability versus the rate is plotted in Fig. 4(a) for both 2 × 2 MIMO and the corresponding FD links, and it is clear that for any given outage probability less than 10% MIMO link has higher outage rate. Fig. 4(b) has plotted outage capacity for different number of antennas and different breakings for the outage probability of 10%. Clearly, MIMO-HD is always supporting higher rates than FD in case of breaking the antennas and considering the outage capacity.

4.2 Capacity with CSIR

Figure 5A:
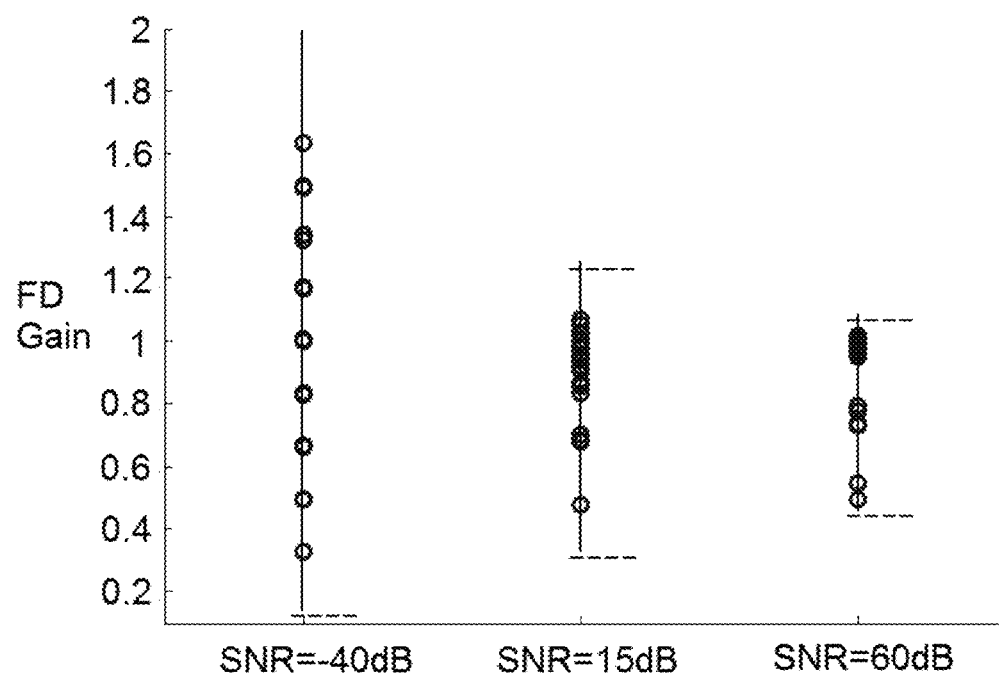
FIG. 5 depicts average gain of using FD radio with different antenna breakages, for N=8, M=4.

According to Eq. (3), depending on the channel realizations, the capacity achievable with MIMO HD and MIMO FD varies. Therefore, the capacity of the two scenarios are compared with histogram figures to illustrates the chances of having better FD capacity than the MIMO capacity. Fig. 5(a) depicts the histograms representing the gain of the FD capacity as defined in Section 3.

Fig. 5(a) illustrates that breaking the antennas for FD will not result in considerable gain if it does provide any gains at all. And please note that what is depicted here is the result for the perfect FD where there is no self-interference residue affecting the capacity of the FD link, which implies that in systems with rate feedback it is better to use MIMO HD instead of breaking the antennas for FD.

4.3 Capacity with CSIT and CSIR

Figure 5B:
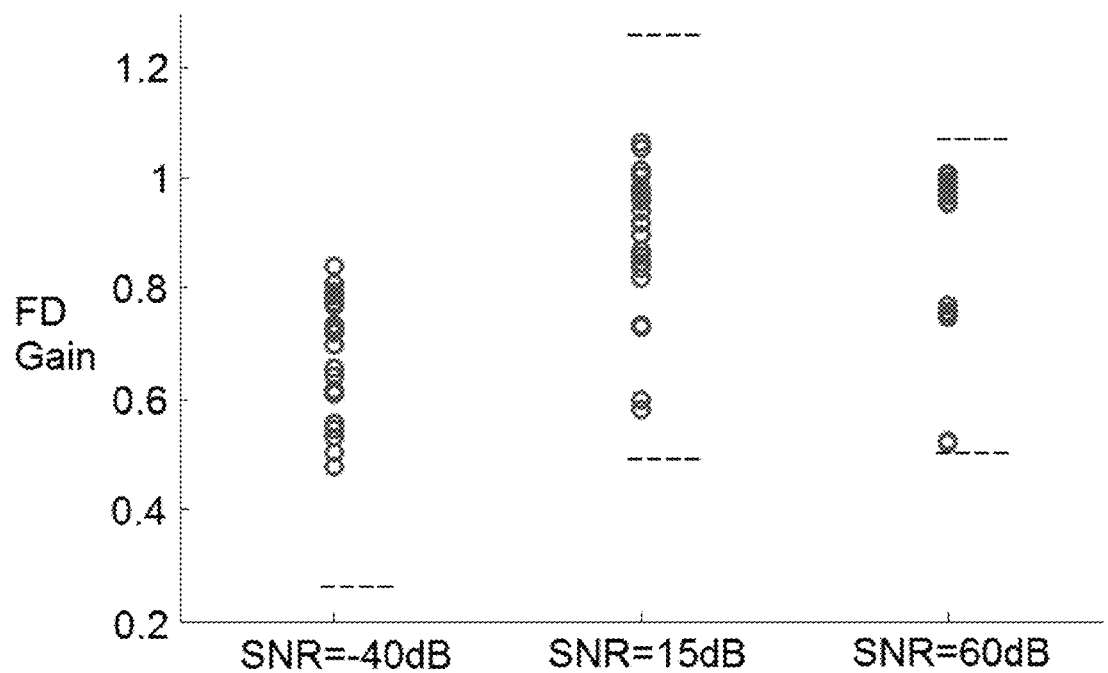

Fig. 5(b) depicts the gain achievable by FD when both transmitter and receiver have exact knowledge of the channel realizations and the capacity of the link is given by Eq. (4). Again histograms are used to illustrate how often it is possible to get gain from FD. As is clear from Fig. 5(b), giving the channel information at the nodes is not enough to get gain from FD transmission and if there is any gain it is negligible considering the fact that the comparison is performed for perfect FD.

4.4 Cellular

As discussed above, breaking the antennas for point-to-point scenarios is a non-efficient strategy for making the FD radios since it can not improve the capacity of the link, and using the links in HD mode and switching between the transmission from node $A$ and $B$ has higher efficiency. Although, the results reported in previous works [1,2] present gains in the throughput when a $2 \times 2$ link is broken to two $1 \times 1$ FD links, the gain is achieved by modifying MAC algorithm and benefits such as eliminating the hidden terminal problem rather than higher rate support in the physical layer. Furthermore, as discussed in [4] it is not fair to consider antenna breakage for FD.

Simulation setting is as follows, we put the clients equispaced on a circle around the AP with distance $D = 5.5m$ and the loss coefficient of the network is $\mu = 4$ where the loss is the loss in the free space given by $L = \left(\frac{\lambda}{4\pi D}\right)^{\mu}$. Clients are having one RF chain for transmit and one chain for receive. We consider the two cases that the clients are FD capable, i.e. $g = 0$ and non-FD capable, i.e. $g = 1$. Access point is equipped with a pair of $N$ antennas each used for one direction only. In each time slot, channel coefficients are generated independently, and the simulation is run for 500 time-slot durations. Other parameters are set as follows: $T_c = 10$, $P_d = 46dBm$, $P_u = 23dBm$.

Figure 6:
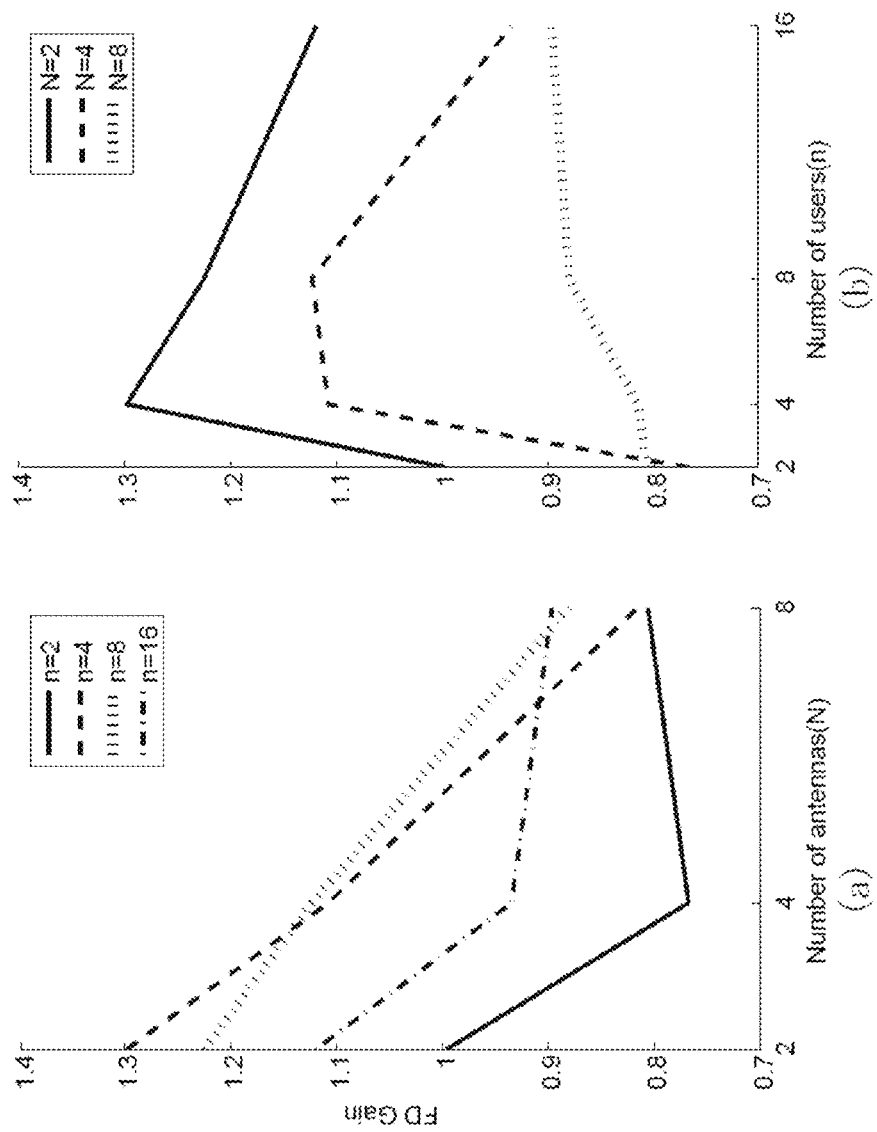
FIG. 6 depicts FD gain (half-duplex clients, breaking the antennas at the AP (access point)) a) for different number of antennas at the AP, and b) for different number of clients.

To study a scheduled cellular setting, we considered both case of breaking the antennas and doubling the number of antennas for the FD transmission. Our simulation results in Fig. 6 show that in cellular setting, breaking antennas in half is still short of providing considerable gain for the throughput of the network even when the self-interference cancellation is perfect.

Fig. 7(a) depicts the gain achievable with FD in a network with $n = 2, 4, 8, 16$ clients and $N = 1, 2, 4, 8$. Increasing the number of antennas, slightly decreases the gain provided by the FD. By increasing the number of antennas, the probability of having more clients scheduled for transmission/reception increases. Since the HD has no limit in the number of users scheduled for DL transmission, average number of users scheduled simultaneously increases steadily by increase in the number of antennas. On the other hand, for FD scheduling, the scheduler needs to take into account both UL and DL transmission and the interference caused by uplink transmissions on downlink receptions, therefore, the FD scheduler does not have the same degree of freedom as the HD scheduler to schedule higher number of users, and if it does, interference from uplink transmissions decreases the achievable rate by downlinks.

Fig. 7(b) illustrates the variations in the FD gain when the number of users are increased and the number of antennas are kept constant. Increasing the number of users increases the FD gain initially, and then slowly decreases the gain after it reaches its maximum. Increasing the number of users gives FD more chances of choosing "non-interfering" simultaneous transmissions. Increasing the number of users, also gives the HD scheduler better chance of scheduling users with good channel conditions. On the other hand, HD always schedules all the users for the uplink transmission with full power, as the optimal scheduling, while, FD activates limited number of uplink users, because of their interference on downlink receivers. Therefore, by increasing the number of users, the uplink throughput of the HD scheduler increases more rapidly than that of FD scheduler. That is why the overall gain of the FD scheduler start to decrease by increasing the number of users. And the drop starts faster for FD-clients, because in network with FD clients, the scheduler starts by scheduling higher number of uplink clients, and saturates faster than the case that full-duplex connection to a single client is not allowed.

Figure 7:
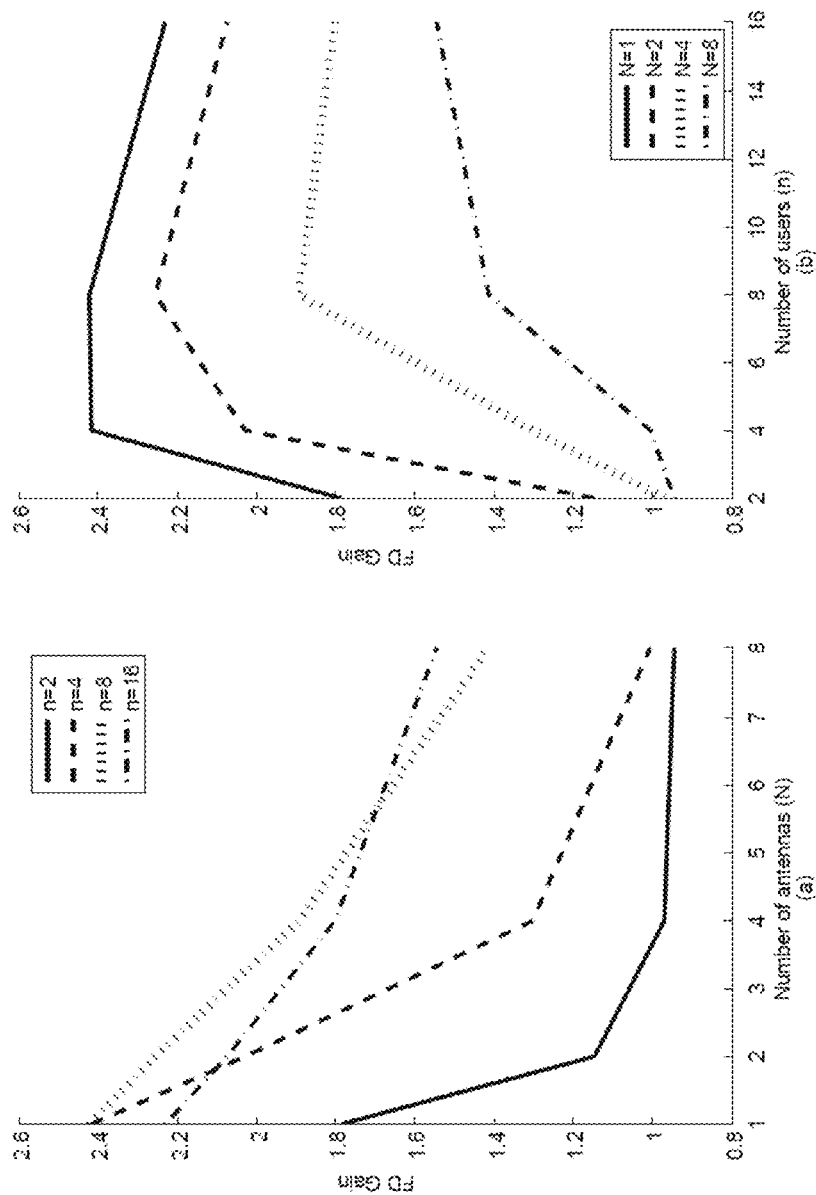
FIG. 7 depicts FD gain a) for different number of antennas at the AP and b) for different number of clients.
Figure 8:
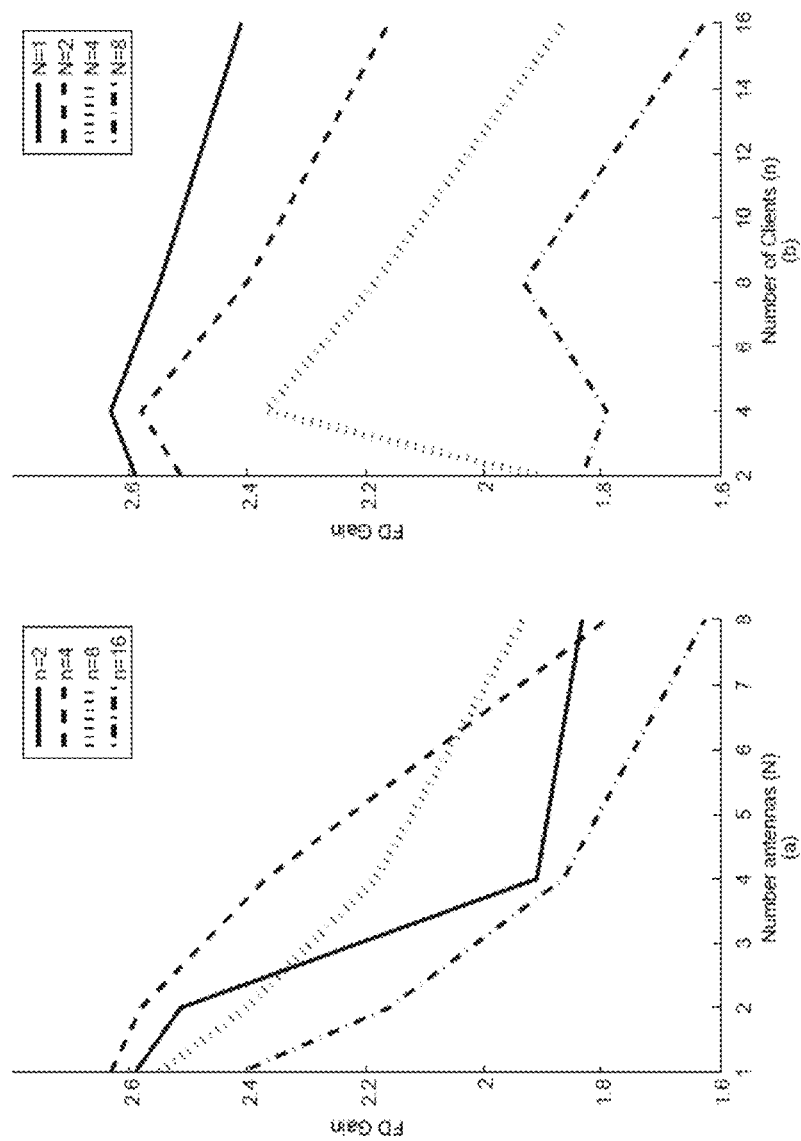
FIG. 8 depicts FD gain (full-duplex clients) a) for different number of antennas at the AP and b) for different number of clients.

Figs. 8 and 7 illustrate the results for the two cases of having full-duplex clients and half-duplex clients respectively. Note that the trend of the variations with respect to system parameters are similar in the two scenarios, while, as expected, network with full-duplex clients has higher throughput than that with half-duplex clients. Full-duplex clients are less sensitive to changes in the number of antennas, but start to lose their gain earlier when the number of users increases.

[6] H. Boche and M. Wiczanowski, "Optimization-theoretic analysis of stability-optimal transmission policy for multiple-antenna multiple-access channel," *Signal Processing, IEEE Transactions on*, vol. 55, no. 6, pp. 2688–2702, 2007.

[7] S. Vishwanath, N. Jindal, and A. Goldsmith, "Duality, achievable rates, and sum-rate capacity of gaussian mimo broadcast channels," *Information Theory, IEEE Transactions on*, vol. 49, no. 10, pp. 2658–2668, 2003.

What is claimed is:

1. An apparatus used in a single-channel full duplex multiple-input multiple-output (MIMO) wireless communications system, the apparatus comprising:
a plurality of antennas, each of which is connected to a combination of at least a TX (transmit) RF (radio frequency) chain and an RX (receive) RF chain,
wherein the plurality of antennas are split into one or more transmit antennas and one or more receive antennas,
wherein the apparatus communicates with another apparatus,
wherein the antenna splitting is performed so that capacity gain is maximized, and
wherein the capacity gain is given by the following formula:

$$\varepsilon\{G_{FD}\} \approx \begin{cases} \dfrac{(M-M_1)+(N-N_1)}{0.5(M+N)} = 2 - 2\dfrac{N_1+M_1}{N+M} & \rho \ll 1 \\ \dfrac{\min(N_1, M-M_1)+\min(N-N_1, M_1)}{\min(N, M)} & \rho \gg 1 \end{cases}$$

where $G_{FD}$ is the capacity gain, $\varepsilon\{\ \}$ is an expectation operator or statistical average, p represents an average SNR (signal to noise ratio), M and N are the numbers of antennas at the apparatus and said another apparatus, respectively, and $M_1$ and $N_1$ are the numbers of transmit antennas at the apparatus and said another apparatus, respectively.

2. The apparatus as in claim 1,
wherein the antenna splitting is based on a channel condition.

3. The apparatus as in claim 1,
wherein, in case that an SNR (signal to noise ratio) is less than a predetermined value, $N_1$ and $M_1$ are set to one, where $M_1$ and $N_1$ are the numbers of transmit antennas at the apparatus and said another apparatus, respectively.

4. The apparatus as in claim 1,
wherein, in case that an SNR (signal to noise ratio) is more than a predetermined value, $M_1$ is set to M/2 (when M is even) or M/2±½ (when M is odd) and $N_1$ is set to N/2 (when N is even) or N/2±½ (when N is odd), where M and N are the numbers of antennas at the apparatus and said another apparatus, respectively, and $M_1$ and $N_1$ are the numbers of transmit antennas at the apparatus and said another apparatus, respectively.

5. The apparatus as in claim 1,
wherein, in case that an SNR (signal to noise ratio) is more than a predetermined value, $M_1$ is set to a value so that the following inequality is satisfied:

$$M > M_1 + N_1 > N,$$

where M and N are the numbers of antennas at the apparatus and said another apparatus, respectively, and $M_1$ and $N_1$ are the numbers of transmit antennas at the apparatus and said another apparatus, respectively.

6. A method implemented in a base station used in a single-channel full duplex multiple-input multiple-output (MIMO) wireless communications system, the method comprising:
scheduling one or more user equipment in an OFDM (Orthogonal Frequency Division Multiplexing) tone used for single-channel full duplex communications, according to a prior schedule and an achieved rate,
wherein the achieved rate comprises a weighted sum rate, and
wherein the weighted sum rate can be expressed as the following expression:

$$\max \sum_{i=1}^{n} \frac{1}{Ra_i(t)} R_i(t),$$

where $$Ra_i(t+1) = \left(1 - \frac{1}{T_c}\right) Ra_i(t) + \frac{1}{T_c} R_i(t),$$

$Ra_i$ is an average rate for link i, $T_c$ is an averaging window size, and $R_i(t)$ is a rate associated with link i in time-slot t, wherein the base station communicates with one or more user equipment.

7. The method as in claim 6, wherein a weight for the weighted sum rate changes in time according to at least one of operation of the single-channel full duplex MIMO wireless communications system and a channel condition.

* * * * *